Oct. 26, 1943.  R. F. ONSRUD  2,332,747
PRIMING OILER FOR CENTRIFUGAL FORCE FEED LUBRICATION
Filed Dec. 16, 1942
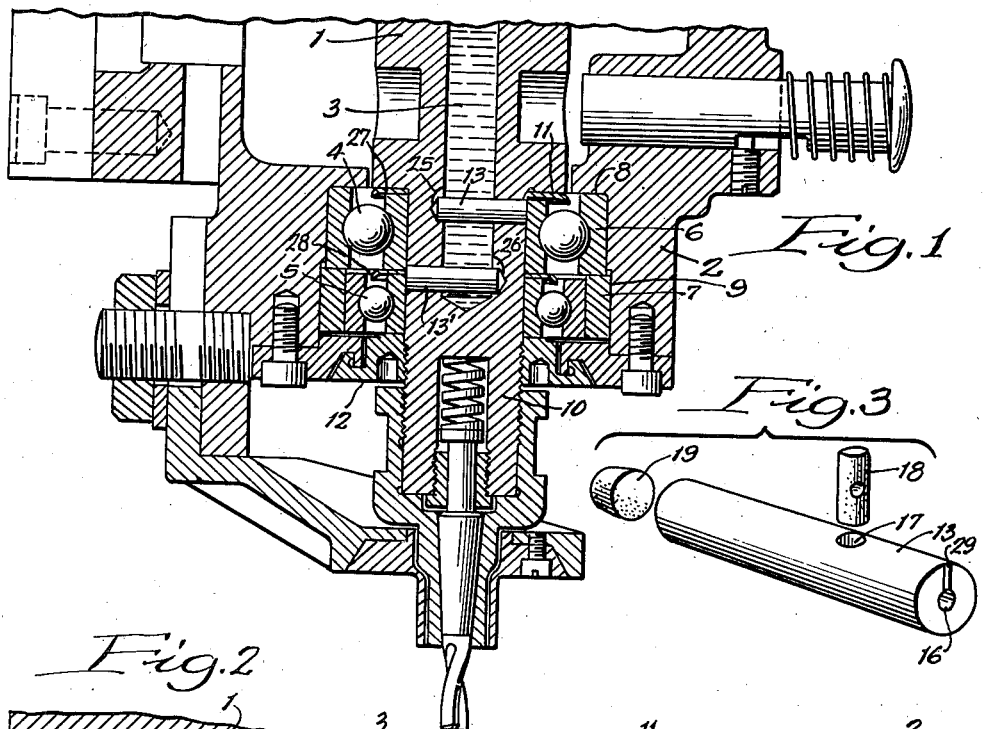
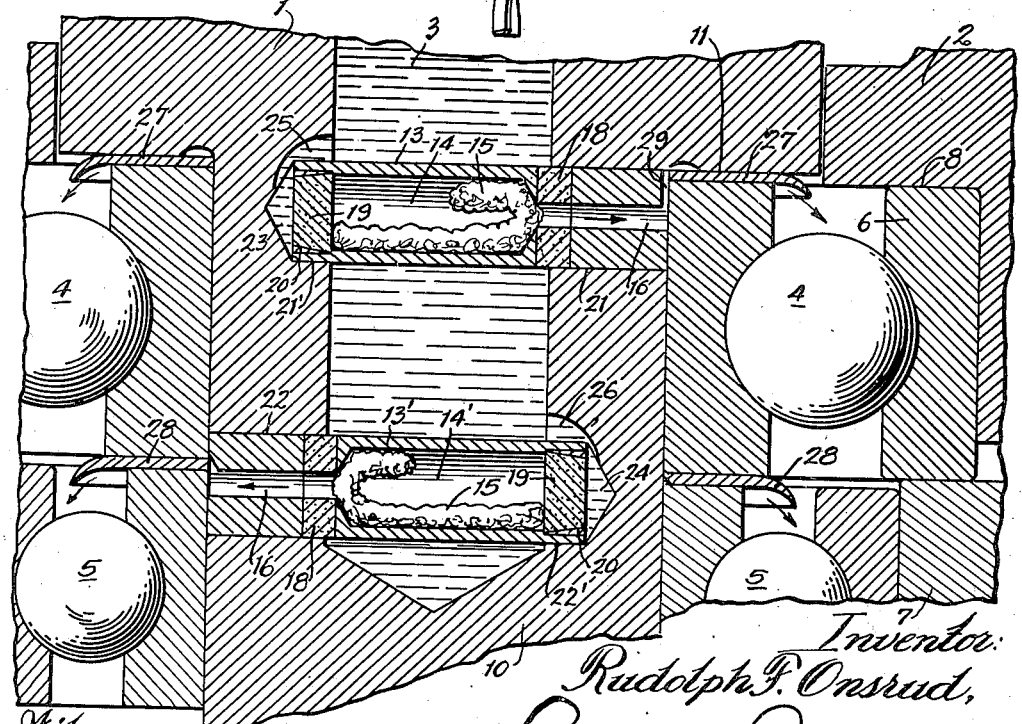
Inventor:
Rudolph F. Onsrud,
by Rummler Rummler & Davis
his Attorneys.

Patented Oct. 26, 1943

2,332,747

UNITED STATES PATENT OFFICE 2,332,747

PRIMING OILER FOR CENTRIFUGAL FORCE FEED LUBRICATION

Rudolph F. Onsrud, Chicago, Ill., assignor to Onsrud Machine Works, Inc., Chicago, Ill., a corporation of Illinois Application December 16, 1942, Serial No. 469,153

9 Claims. (Cl. 308—187)

This invention relates to improvements in lubricating systems and particularly to lubrication systems for high speed spindles.

The main objects of this invention are to provide a new and novel lubricating system for high speed spindles; to provide a device of this character wherein an even flow of a fine mist of lubricant is supplied to the bearings of a high speed spindle at all times; to provide a device of this character wherein an even flow of lubricant is delivered in minute quantities to the bearings of a high speed spindle during the operation of the spindle; to provide a device of this character which will prevent an over supply of lubricant from being delivered to bearings of a high speed spindle at any time during operation of the spindle or while the spindle is at rest; to provide a device of this character which is automatic in operation and requires no manual control or adjustment; to provide a device of this character wherein lubricant is supplied to the bearings of a high speed spindle immediately upon starting of the spindle; to provide a device of this character wherein the centrifugal force developed by spindle rotation is used as the power to feed the lubricant to the bearings; and to provide in a device of this character, means to prevent flow of lubricant from the reservoir to the bearings of a high speed spindle when the spindle is at rest and yet allow for passage of the lubricant when the spindle is in operation.

An illustrative embodiment of this invention is shown in the drawing wherein:

Fig. 1 is a longitudinal sectional view partly broken away through the lower end of a spindle which has the device of my invention incorporated therein.

Fig. 2 is an enlarged detail view, in section, illustrating my invention.

Fig. 3 is a perspective view of the oil feed duct and plugs.

Referring in detail to the drawing, I have illustrated my invention as being incorporated in a high speed spindle 1 which is journaled in a router head 2. The spindle is bored axially to provide an oil reservoir 3, and is also provided with four sets of bearings 4 and 5, two sets being located adjacent the lower end of the spindle 1 as shown in Figure 1 of the drawing and two sets of which are located adjacent the upper end of the spindle but which are not illustrated herein as they are identical with, and perform the same function as, the lower sets of bearings. The bearings 4 and 5 and their respective retainers 6 and 7 are held in position on the spindle by suitable shoulders 8 and 9 which are formed in the router head 2. The outer ends 10 of the spindle are smaller in diameter than the body thereof and therefore a shoulder or seat 11 is also provided against which the upper portion of the bearing housing 6 is seated. The retainer element 12 is adapted to secure the bearings 4 and 5 in position on the spindle.

In high R. P. M. spindles great difficulty has been experienced in properly lubricating the bearings 4 and 5 because of the presence of centrifugal force which tends to throw the lubricant out of the rotating parts of the bearing. If the lubricant which is thrown out is not quickly replaced the bearings will burn out rapidly. In high R. P. M. spindles such burnouts can and usually do occur within a minute or even less time. Another problem which has arisen is that of adjustment of the feed of lubricant to the bearing to be certain that the lubricant which has been discharged from the bearing chamber, due to the centrifugal force, has been replaced therein. An excessive supply of lubricant offers resistance to bearing rotation thereby generating heat and decreasing the R. P. M. I have also found that after a bearing has remained idle for several hours or a day or more, substantially all the oil previously supplied to the bearing has been lost through evaporation. It is absolutely essential that oil be immediately supplied to the bearings before the spindle is set into rapid rotation; otherwise the bearing will burn out rapidly.

To overcome these problems I provide a new and improved lubrication duct 13, which is cylindrical in shape. The duct 13 is bored axially to form an oil chamber 14 into which a wick 15 is placed. The wick has its end bent back upon itself in hooked form to cover the mouth of the passageway 16 through which the lubricant in reservoir 3 and chamber 14 is discharged to the bearings. The duct 13 is also provided with a perforation 17 which extends vertically through the duct 13, at a point adjacent the inner end wall of chamber 14, but not therethrough. The perforation does however extend through the passageway 16 as clearly shown in Figure 2. A porous plug 18, of metal, wood bone or the like is seated in the perforation 17. Lubricant in reservoir 3 passes through the plug 18 into the passageway 16 when the spindle is in operation, primarily because of the centrifugal pressures created in the reservoir 3. A porous plug 19 of the same material as plug 17 is inserted in the mouth of the oil reservoir 14 and is securely anchored therein by any suitable means such as by solder 20 or the like.

I have found it expedient to employ one feed duct 13 for each bearing used in a high R. P. M. spindle; hence I show an oil duct 13 for the bearings 4 and an oil duct 13' for bearings 5, in the drawing.

The ducts 13 and 13' are arranged to span the oil reservoir 3 in a position which is transverse to the axis of the spindle 1. The ducts are seated in bores and sockets 21, 21' and 22, 22' respectively, located in the walls of the spindle 1. Each bore and socket is positioned in axial alignment. The discharge ends of the ducts 13 and 13' being positioned in the bores 21 and 22 respectively while the other ends containing the chambers 14 and 14' seat in sockets 21' and 22' respectively.

It will be noted that the inner ends of the sockets 21' and 22' are conical in shape as at 23 and 24 respectively to provide oil pockets. These pockets are intentionally formed by the pointed end of a drill in forming the bores and sockets. Also the walls of the oil chamber 3, directly above the pockets 23 and 24 are cut away as at 25 and 26 respectively to form a communication between the oil pockets 23 and 24 and the oil reservoir 3 respectively. Lubricant from the chambers 3 and 23 must pass therethrough before entering the chamber 14.

The upper ends of the ducts 13 and 13' are positioned in the spindle in such a manner that they are in substantial alignment with the upper surfaces of the ball bearing retainers 6 and 7 respectively.

I have found it expedient to place lubricant distributing washers and spacers 27 and 28 between the shoulder 11 and the upper face of the bearing retainer 6 and between the bearing retainers 6 and 7 respectively. The perimeter of each spacer is bent downwardly to form a flange to direct the lubricant to the bearings as will be hereinafter explained.

It will be apparent that upon rotation of the spindle the lubricant in the reservoir 3 will, because of the centrifugal forces created therein, tend to cling to the walls of the reservoir. I have, therefore, provided that the porous plug 18 of the feed duct 13 shall have at least a portion thereof exposed to the oil reservoir so that the lubricant will be forced through the porous plug 8 from either or both ends thereof and flow into the channel 16 and be discharged therefrom into the vertical channel or groove 29 located in the discharge end of the oil feed duct, where, due to rotation and the centrifugal forces created thereby, the oil will flow upwardly through the channel 29 and along the upper and lower faces of the oil distribution washer and spacer 27, outwardly to the perimeter thereof. Because of the downwardly turned flange thereon, the lubricant will be directed to the face of the bearing. Since the bearing retainers 6 and 7 and the spacers 27 are not integrally secured to the spindle or together, the lubricant will readily flow therebetween.

Simultaneously, the lubricant on the opposite wall of the spindle 1 will be directed through the channel 25 into the oil pocket 23 and pass therefrom through the porous plug 19 into the oil reservoir 14 where it will be picked up by the wick 15 and be discharged into the passageway 16. It there mixes with the lubricant entering the channel 16 through the porous plug 18.

The plugs 18 and 19 are of such porosity that only a predetermined amount of lubricant will pass therethrough and hence, control of the lubricant reaching the bearing is readily had.

In high speed spindles of this character the spindle is often stopped and started by the operator so as to view the work and, hence, it is necessary to insure that a few drops of lubricant are always available for lubricating the bearing upon starting of the spindle. It is immaterial whether or not the spindle is used in a vertical position or in a horizontal position because the wick 15 will always tend to become saturated with the lubricant in the chamber 14. Therefore upon immediate rotation of the spindle the oil in the wick will tend to deposit several drops in the passageway 16, upon initial starting of the spindle and be deposited on the bearings within seconds after the spindle begins to rotate.

It will be noted from the drawing that I have found it expedient to dispose the oil feed ducts 13 and 13' in opposite positions. This is not absolutely necessary or essential but is merely one method of construction.

From the foregoing it will be apparent that since the lubricant from the reservoir 3 is fed to the discharge passageway 16 in minute quantities because of the porous plugs 18 and 19 tend to break up the oil and hence only small quantities of lubricant are delivered to the bearings and therefore the objections, heretofore discussed, to have been found in the present methods of lubrication for high speed spindles have been overcome. Also, and most important, is the fact that momentarily upon rotation of the spindle a few drops of oil are delivered to the bearing so that the chances of the bearing becoming burned out, due to lack of lubricant, is entirely eliminated as long as the reservoir 3 contains some lubricant.

Although but one specific embodiment of this invention is herein shown and described, it is to be understood that some of the details set forth may be altered or omitted without departing from the spirit of the invention as defined by the following claims.

I claim:

1. A lubricating system for high speed spindles, an oil reservoir in said spindles, an oil feed duct having a large axial bore in one end forming an oil chamber and a relatively smaller axial bore in the other end forming a discharge passageway, and said bores communicating with each other, a porous plug securely anchored in the open end of said chamber, a second porous plug positioned in said duct transversely to the axis of said duct and extending through said passageway at a point substantially adjacent the inner end of the chamber, the outer ends of said duct being seated in the walls of said spindle and lying in a plane transverse to the axis of said spindle.

2. A lubricating system for high speed spindles, an oil reservoir in said spindles, an oil feed duct having a large axial bore in one end forming an oil chamber and a relatively smaller axial bore in the other end forming a discharge passageway, and said bores communicating with each other, a porous plug securely anchored in the open end of said chamber, a wick in said chamber, a second porous plug positioned in said duct transversely to the axis of said duct and extending through said passageway at a point substantially adjacent the inner end of the chamber, the outer ends of said duct being seated in the walls of said spindle and lying in a plane transverse to the axis of said spindle.

3. The device as set forth in claim 2 wherein the second porous plug is located in the duct so that the end is exposed to the oil reservoir in the chamber.

4. A high speed spindle having an axial bore extending substantially the entire length of the spindle to provide an oil reservoir for lubricating the bearings thereof, in combination with a feed duct comprising an elongated cylinder disposed within said spindle and lying transversely to the axis of said spindle to span said oil reservoir, a long axial bore in one end of said duct to form an oil chamber, a wick in said chamber, a porous plug securely anchored in the mouth of said chamber, the other end of said duct having a discharge passageway located therein and communicating with said chamber, a second porous plug in said duct extending in a plane transverse to the axis of said duct and terminating in said passageway.

5. The device set forth in claim 4 wherein means are provided to direct the oil from the passage directly to the face of the spindle bearings.

6. A high speed spindle having an axial bore extending substantially the entire length of the spindle to provide an oil reservoir for lubricating the bearings thereof, in combination with a feed duct comprising an elongated cylinder disposed within said spindle and lying transversely to the axis of said spindle to span said oil reservoir, a large axial bore in one end of said duct to form an oil chamber, a wick in said chamber, a porous plug securely anchored in the mouth of said chamber, the other end of said duct having a discharge passageway located therein and communicating with said chamber, a second porous plug in said duct extending in a plane transverse to the axis of said duct and terminating in said passageway, the exterior ends of said plug being exposed to the lubricant in said oil reservoir.

7. A priming oiler for centrifugal force feed systems comprising a duct, having a large axial bore in one end thereof to form an oil reservoir and a smaller axial bore in the other end thereof communicating with the larger bore to form a discharge passageway, a porous plug to close the open end of the larger bore and a second porous plug in said duct extending transversely to the axis of said duct and terminating in the smaller axial bore.

8. The device set forth in claim 7 wherein the second porous plug extends through said duct and discharge passageway.

9. In a centrifugal force feed lubrication system for high speed spindles, the combination of a spindle having an oil reservoir located in the axis of the spindle, bearings for said spindle, and a porous plug anchored in opposite walls of said spindle and lying in a plane transverse to the axis of said spindle and which plug has direct communication with said bearings, whereby said plug will supply minute quantities of oil to said bearings from said reservoir immediately upon rotation only of said spindle.

RUDOLPH F. ONSRUD.